Patented Dec. 18, 1923.

1,477,964

UNITED STATES PATENT OFFICE.

ELMYR A. LAUGHLIN, OF OREGON, ILLINOIS.

METHOD OF PRODUCING STOCK FEED FROM COARSE FARM PRODUCTS.

No Drawing.   Application filed November 6, 1922.   Serial No. 599,451.

*To all whom it may concern:*

Be it known that I, ELMYR A. LAUGHLIN, a citizen of the United States, residing at Oregon, in the county of Ogle, State of Illinois, have invented certain new and useful Improvements in Methods of Producing Stock Feed from Coarse Farm Products; and I do hereby declare the following to be a full, clear, and exact description of the invention, such as will enable others skilled in the art to which it appertains to make and use the same.

The object of the invention is to produce a simple, practical and inexpensive method of converting raw or uncooked grains, hay, fodders and the like into a more palatable, nutritious and digestible form for use as stock feed.

The conversion of such products with diastase, especially for distillation purposes, is of course well known, but in the methods heretofore practiced it has usually been deemed necessary to cook the material to reduce it to a mass or mash of gelatinous consistency and the temperature thereby involved—at or about boiling point of water, substantially reduces the digestibility of the protein, particularly when supplemented by a period of treatment (as is usual) extending over many hours, at said high temperature to be followed by a period necessary to cool the mass to 120° F. or less. At this stage, under the old procedure the diastase was added and the temperature of the mass was then raised to about 150° F. (where the diastatic action ceased). This raising of the temperature usually occupied from four to eight hours and in addition to the expense thus due to the time factor, the moisture added for the cooking purpose and with the solution of diastase has reduced the mass to a consistency of "soup" which is unsuitable for cattle feed as the stomach of the animal will not hold a sufficiently nourishing quantity of food in that form. Consequently, under the previous method it became necessary to still further add to the cost of production of the feed by the extraction or evaporation of a portion of the water which had the additional disadvantage of carrying of a large portion of the volatile sugars, carbohydrates, alcohol and other constituents resulting from the diastatic action, and representing valuable nutritive elements of the feed.

It is stated on the authority of Ira Remsen, (Universal Cyclopedia, Revised Edition) when starch is dissolved in a solution of diastase at 63°, (centigrade) one-third is converted into dextrin and two-thirds into maltose, and that the activity of diastase is greatly influenced by heat, the action thereof stopping at from 75° to 76° (centigrade), I have found by experiment that the diastase such as malt, or the like, may be placed in water up to say 180° F. and maintained at that temperature from five to ten minutes or even longer without destroying the action or the active properties thereof, and that the full effect of such properties can be secured with safety and certainty by reversing the usual method of procedure in the conversion of the products from the raw material, as by progressively reducing instead of progressively increasing the temperature, and without subjecting the materials to a boiling or cooking temperature, and by subjecting the material to a maximum temperature which is sufficiently below the boiling point of water to avoid any likelihood of detracting from the efficiency of the diastase in its action upon the products, or the protein.

In carrying out the invention, therefore, the material is first preferably comminuted or reduced by chopping or grinding of coarse farm products, such for example as corn fodder which is field cured and dried, and placed in a tight vessel or receptacle which is preferably heat insulated after the manner for example of a fireless-cooker or its equivalent for the purpose of conserving and maintaining for a considerable length of time the heat of an object or mass placed therein, and to this raw product (in its natural state) there is added a solution, in water, of diastase, the amount of solution being by weight from three to four times that of the raw material and being at a temperature of approximately 175° F. and containing an amount of diastase which by weight is between five and ten per cent of that of the raw material (depending upon the diastatic strength of the malt). The diastase should be thoroughly dissolved in the water before adding as an infusion to the material in the vessel or receptacle and upon the application of the solution the vessel or receptacle should be closed and permitted to remain in that condition without the use of any additional heat for a period of from five hours to seven hours. During this period obviously the heated mass will become gradually reduced in temperature, losing, for example, about 10° F. for each hour that it is permitted to stand, so that at the end of a period of about six hours the temperature of the mass has been reduced to about 110° or 115° F. In this condition it is ready to be fed to the stock and being warm and sweet it may be preserved in condition for feeding, providing the receptacle is kept closed, for many hours after the actual process has been completed.

The effect of this process is an actual increase by analysis of the amount of protein contained in the mass as compared with that of the ingredients, as it has been found by tests that while the fodder carried but seven per cent protein, the converted and digested mass at the end of the treatment showed a content of ten and one-half per cent, moisture free basis. It has further been found by experiment that a bushel of barley, containing four and one-half pounds of protein, after having been sprouted and turned into malt with the application of nothing but water and heat, has produced thirty-five pounds of malt and contained seven pounds of protein.

There is moreover an advantage due to the fact that the diastase is in itself a digestive agent and that the material is pre-digested and its food value is materially increased if after preparation in accordance with the method herein disclosed, it is suppled to the stock while warm and within a comparatively short period after the completion of the process, for the reasons that the mechanical calories add food value under these conditions.

The product by test has been found to constitute a complete and well balanced food for cattle and by actual experiment when used without other foods or materials and, for example, during a period of six weeks or more in connection with dairy cattle, it has been found not only to increase the dairy product but also to increase the weight of the animal, as distinguished from other feeds which, in increasing the flow, invariably reduces the butter fat or body weight, and vice versa.

What is claimed is:

1. The process of reducing coarse farm products to stock feed which consists in subjecting the products, in a solution of diastase, through gradually reducing temperatures from a point below the boiling point of water, to a point suitable for stock consumption.

2. The process of reducing coarse farm products to stock feed which consists in treating the same to the action of a heated liquid solution of diastase at a temperature less than the boiling point and more than 150° F. and then gradually reducing to a degree suitable for stock consumption.

3. The process of reducing coarse farm products to stock feed which consists of heating water which in volume by weight is two to five times the weight of the material to be treated, to a degree less than boiling point but greater than 150° Fahr., then dissolving the diastase in this heated water and then putting this solution on to the material to be treated promptly and before the diastase qualities have been killed.

4. The process of reducing coarse farm products to stock feed which consists of dissolving diastase in water that has previously been heated to less than the boiling point but greater than 150° F. and by quantity not less than two times or more than five times by weight than the material to be treated, and then promptly applying it to the material substantially as described.

In testimony whereof I affix my signature, in the presence of two witnesses.

ELMYR A. LAUGHLIN.

Witnesses:
M. E. FLYNN,
M. J. FLYNN.